US009507929B1

(12) United States Patent
Kumar et al.

(10) Patent No.: US 9,507,929 B1
(45) Date of Patent: Nov. 29, 2016

(54) DECENTRALIZED INFORMATION FLOW SECURING METHOD AND SYSTEM FOR MULTILEVEL SECURITY AND PRIVACY DOMAINS

(71) Applicant: TATA INSTITUTE OF FUNDAMENTAL RESEARCH, Mumbai (IN)

(72) Inventors: N. V. Narendra Kumar, Mumbai (IN); R. K. Shyamasundar, Mumbai (IN)

(73) Assignee: TATA Institute of Fundamental Research, Mumbai (IN)

( * ) Notice: Subject to any disclaimer, the term of this patent is extended or adjusted under 35 U.S.C. 154(b) by 0 days.

(21) Appl. No.: 14/733,285

(22) Filed: Jun. 8, 2015

(51) Int. Cl.
*G06F 21/45* (2013.01)
*G06F 21/44* (2013.01)

(52) U.S. Cl.
CPC ............... *G06F 21/44* (2013.01); *G06F 21/45* (2013.01)

(58) Field of Classification Search
CPC ................................. G06F 21/44; G06F 21/45
See application file for complete search history.

(56) References Cited

U.S. PATENT DOCUMENTS

| 8,438,224 | B1 * | 5/2013 | Chirita | G06Q 30/0231 709/203 |
| 2011/0238984 | A1 * | 9/2011 | Roush | G06F 21/53 713/166 |
| 2012/0291106 | A1 * | 11/2012 | Sasaki | G06F 21/556 726/5 |
| 2013/0086623 | A1 * | 4/2013 | Walsh | G06F 21/6218 726/1 |
| 2014/0007184 | A1 * | 1/2014 | Porras | G06F 21/53 726/1 |
| 2014/0325684 | A1 * | 10/2014 | Takeyasu | H04L 63/20 726/29 |
| 2015/0156342 | A1 * | 6/2015 | Fries | H04N 1/00411 358/1.15 |
| 2015/0188949 | A1 * | 7/2015 | Mahaffey | H04L 63/20 726/1 |

OTHER PUBLICATIONS

Osborn et al, Configuring role-based access control to enforce mandatory and discretionary access control policies, May 2000, ACM ,vol. 3 Issue 2, May 2000, pp. 85-106.*
D. E. Bell and L. J. LaPadula. Secure computer systems: Unified exposition and multics interpretation. In Technical Report ESD-TR-75-306, MTR-2997, MITRE, Bedford, Mass, 1975.
K. Biba. Integrity considerations for secure computer systems. Tech Report ESDTR-76-372, MITRE, Mass, 1976.
D. E. Denning. A lattice model of secure information flow. Comm. ACM, 19(5):236-243, 1976.
A. C. Myers and B. Liskov. A decentralized model for information flow control. In SOSP '97, pp. 129-142, New York, NY, USA, 1997.
Department of Defense Standard—5200.28-STD. Trusted Computer System Evaluation Criteria. Dec. 1985.
A. C. Myers and B. Liskov. Protecting privacy using the decentralized label model. ACM Trans. Softw. Eng. Methodol. 9(4):410-442, Oct. 2000.
D. Stefan, A. Russo, D. Mazi'eres, and J. C. Mitchell. Disjunction category labels. In Proceedings of the 16th Nordic Conference on NordSec, pp. 223-239, Berlin, Heidelberg, Springer-Verlag 2012.
B. Lampson. Making untrusted code useful: technical perspective. CACM, vol. 54 No. 11, p. 92, Nov. 2011.

* cited by examiner

*Primary Examiner* — Izunna Okeke
*Assistant Examiner* — Ali Shayanfar
(74) *Attorney, Agent, or Firm* — D'Ambrosio & Menon, PLLC; Usha Menon

(57) ABSTRACT

The present invention discloses a method for securing information flow in an information system. The method comprises intercepting access requests to information in the information system by all applications running in the information system, intuitively assigning labels to all the information and the applications depending on the application requirements, combining the application making the access request and the information for which the access request is made with their respective labels, checking allowance of the access request based on comparison of the label corresponding to the application making the access request and the label corresponding to the information for which the access request is made and accordingly providing access of the information to the application on detection of allowable access request else denying the access request.

7 Claims, 2 Drawing Sheets

DECENTRALIZED INFORMATION FLOW SECURING METHOD AND SYSTEM FOR MULTILEVEL SECURITY AND PRIVACY DOMAINS

FIELD OF THE INVENTION

Embodiments of the invention relates to securing information flow in an information system. In particular, one or more embodiments of the invention are directed to develop an information flow securing method which will be adapted to control the decentralized information flow taking into account both the readers and writers of information in the information system.

BACKGROUND OF THE INVENTION

Assurance—evidence that a computer system is secure with respect to a given security policy—is an important theme in secure computing. Assurance would have been indeed possible, if the underlying hardware and software had been shown to be correct as per the intended specifications. However, showing the correctness of hardware/software in totality is impossible. It may be pointed that bugs in an application can enable data stealing. That is why, it is important to assure the absence of information leaks in any application. One of the beginning building blocks towards such an assurance is the first building of a system's Trusted Computing Base (TCB)—realized correctly—through which a complete secure system could be built. For high assurance, the TCB needs to be small and the policy simple. Information flow control (IFC) is one such policy; it specifies how information is allowed to move around in a system and disseminated.

In late 1960s, the US military started the visualization of a "multilevel" computer system wherein information leaks from a user process handling classified data can be either shown to be leak free or at least accountability of the leak can be traced. Of course, it is impractical to require every application program to come from a trusted source; many essential tools are too big and complicated to rebuild, or even to audit. IFC solves this problem by requiring that no action of a secret process can affect the state of an unclassified one.

In 1973, Bell and LaPadula [ref: D. E. Bell and L. J. LaPadula. Secure computer systems: Unified exposition and multics interpretation. In Technical Report ESD-TR-75-306, MTR-2997, MITRE, Bedford, Mass., 1975.] formulated a mathematical framework and a model for IFC to deal with the problems of confidentiality in the context of military computer systems. The model has since been refined and extended with the objective of producing a secure computer system design. From a different perspective, Biba [ref: K. Biba. Integrity considerations for secure computer systems. Tech Report ESDTR-76-372, MITRE, Mass, 1976.] developed integrity policies for addressing the problems of improper data modification posed by secure military computer utility.

In 1976, Denning [ref: D. E. Denning A lattice model of secure information flow. Comm ACM, 19(5):236-243, 1976.] derived a lattice model of secure information flow that permits concise formulations of the security requirements of several existing systems and facilitates construction of mechanisms that enforce security. Further, the model provides a unifying view of all systems that restrict information flow including BLP and Biba.

In Denning's model, each subject and object is assigned a security class/label, and permissible information flows are defined by a binary relation on security classes. When a subject i.e. the active entities whose actions cause information to flow requests an operation to be performed on an object i.e. the passive entities containing information, it is granted only if the resulting information flow satisfies the permissible flow relation. The flow rule is good because it composes: if each step obeys the rule, the whole computation does so. Hence the label on every data item is at least the maximum of the labels on everything that affected it; the rule is end to end. It is certainly simple, and assurance is just evidence that each step obeys it.

The work of Myers and Liskov [ref.: A. C. Myers and B. Liskov. A decentralized model for information flow control. In SOSP '97, pages 129-142, New York, N.Y., USA.] (DIFC) in 1997, revived the field by deriving a decentralized label model that allows subjects to create their own labels for controlling the flow of their data. DIFC became popular due to the decentralized nature of flow control and led to the development of several systems for realizing secure programming systems (Jflow, FlowCaml etc.), operating systems (Asbestos, HiStar, Flume, Laminar etc.) and distributed systems (Fabric, DStar, Airavat etc.).

In the early 1980s research on information flow led to the Trusted Computer System Evaluation Criteria ("Orange Book") [ref.: Department of Defense Standard—5200.28-STD. Trusted Computer System Evaluation Criteria. December 1985], which defines the security of a computer system by how well it implements flow control and how good its assurance is. Despite a lot of effort being invested in developing systems satisfying these criteria, they all had the following problems: large TCB, slow, not easy to use, and very limited functionality.

Myers' label system called DLM [ref.: A. C. Myers and B. Liskov. Protecting privacy using the decentralized label model. ACM Trans. Softw. Eng. Methodol. 9(4):410-442, Oct. 2000.] includes only readers for protecting confidentiality and only writers for protecting integrity. However, it is important to note that for a proper tracking of any information flow property, it is important to control both reading and writing by subjects. Stefan et al. introduced a label system referred to as DC labels [ref.: D. Stefan, A. Russo, D. Mazi'eres, and J. C. Mitchell. Disjunction category labels. In Proceedings of the 16th Nordic Conference on NordSec, pages 223-239, Berlin, Heidelberg, 2012. Springer-Verlag] that incorporate both readers and writers. But it must be noted that it is not easy to derive DC labels for modelling a given requirement. Moreover, their support for discretionary controls is orthogonal to the IFC and thus defeats the purpose of the mandatory controls.

Butler Lampson—a Distinguished Computer Scientist, in a recent technical perspective [B. Lampson. Making untrusted code useful: technical perspective. CACM, Vol. 54 No. 11, Page 92, November 2011.] on HiStar says "This is the latest step in the long and frustrating journey toward secure computing. It is a convincing solution for some serious practical problems. The general-purpose computing that failed in the 1980s has not been tried".

SUMMARY OF THE INVENTION

With the explosion of information, it has become essential for trusted information systems to interact with untrusted systems, particularly so, with the promotion of cloud computing. In fact, building secure applications from mostly untrusted code by using information flow control to enforce data security is a challenge. For example, enforcing data security policy when executing untrusted code with access to sensitive data is important as an untrusted application may be able to read some sensitive data, but it should never be able to surreptitiously export this data from the system. Thus, it has become essential to avoid information leaks and protect systems from information adulteration. While there is a spectrum of good access/authorization mechanisms available, the existing security models do not cater to the challenges. One of the main reasons for this has been the lack of models that provide a robust unification of mandatory access control (MAC) and discretionary access control (DAC) of information. In the context of networked distributed systems, it becomes further necessary to broaden the scope to include the control of information flow between distributed nodes on a system wide basis rather than on an individual basis. It may be noted that different data manipulated by an application have different security requirements. A unified security model is indeed the need of the hour for assuring security of operating systems, programming languages, virtualization, web interaction etc. The one or more embodiments of the invention propose a novel security method that provides succinct information flow control across the stakeholders of the system consisting of various subjects and objects that are distributed system wide, through the basic actions of read and write. The one or more embodiments of the method of the invention captures the subtle way the information gets disseminated in the system after the resource is accessed in an authorized way and leads to succinct definitions of information flow policies with respect to security, privacy and other legal requirements.

Thus, according to the basic aspect of the one or more embodiments of the invention there is provided a method of securing information flow in an information system comprising: intercepting access requests to information in the information system by all applications running in the information system; intuitively assigning labels to all the information and the applications depending on the application requirements constituting state information; combining the application making the access request and the information for which the access request is made with their respective labels; checking allowance of the access request based on comparison of the label corresponding to the application making the access request and the label corresponding to the information for which the access request is made; accordingly providing access of the information to the application on detection of allowable access request else denying the access request.

According to another aspect in the method of securing information flow in an information system, the state information appropriately changed on allowable access request and if operation corresponding to the access request is either creating or reading of the information or administrative.

According to another aspect in the method of securing information flow in an information system, the assigning the labels to all the information and the applications depending on the application requirements includes assigning the labels to all subjects corresponds to active entities whose actions cause information to flow and all objects corresponds to passive entities containing the information in the said information system.

According to a further aspect in the method of securing information flow in an information system, the label assigned to the subject comprises: a first component for denoting authority; a second component for denoting set of subjects that can be influenced indicating set of readers of the information contained in the object which is accessed by the said subject; and a third component for denoting set of subjects that have influenced indicating set of writers of the information contained in the object which is accessed by the said subject.

According to a further aspect in the method of securing information flow in an information system, the label assigned to the object comprises: a first component for denoting ownership; a second component for denoting set of subjects that can be influenced indicating set of readers of the information contained in said object; and a third component for denoting set of subjects that have influenced indicating set of writers of the information contained in said object.

According to yet another aspect in the method of securing information flow in an information system, the label assigned to the subject and the object are defined as (A, R, W) where A is a function denoting the first (administration) component of the label, R is a function denoting the second (readers) component of the label, W is a function denoting the third (writers) component of a label.

According to a further aspect in the method of securing information flow in an information system, the label assigned to the subjects are mostly dynamic and includes lowest or default label and highest or clearance label.

According to yet another aspect in the method of securing information flow in a information system, the label assigned to the objects are mostly static and are assigned at creation/initiation.

According to another aspect in the method of securing information flow in an information system, the lowest label of the subject s is set to (s, S, { }) while its highest label is set to (s, {s}, S), wherein the lowest and the highest labels of the subject can be automatically derived from the object labels, S is the set of all the subjects in the information system.

According to a further aspect in the method of securing information flow in a information system, the comparison of the label corresponding to the subject making the access request and the label corresponding to the object for which the access request is made and therefrom allowing the access request includes: allowing access when the subject 's' with label $(s_1, R_1, W_1)$ requests read access to the object 'o' with label $(s_2, R_2, W_2)$ and if $s_1 \in R_2$; allowing access when the subject 's' with label $(s_1, R_1, W_1)$ requests write access to the object 'o' with label $(s_2, R_2, W_2)$ and if $s_1 \in W_2$ and $R_1 \supseteq R_2$ and $W_1 \subseteq W_2$; allowing access when the subject 's' with label (s, R, W) requests creation of the object and creating the object 'o' with label (s, R, W∪{s}); allowing access when the subject 's' with label $(s_1, R_1, W_1)$ requests the object 'o' with label $(s_2, R_2, W_2)$ to be downgraded to label $(s_3, R_3, W_3)$ if $s_1 \in R_2$ and $s_1 = s_2 = s_3$ and $W_1 = W_2 = W_3$ and $R_1 = R_2$ and $R_3 \supseteq R_2$ and $R_3 - R_2 \subseteq W_2$; allowing access when the subject 's' with label $(s_1, R_1, W_1)$ requests the object 'o' with label $(s_2, R_2, W_2)$ to be relabelled with $(s_3, R_3, W_3)$ if $s_1 \in R_2$ and $s_1 = s_2 = s_3$ and $W_2 \subseteq W_1$ and $W_3 = W_1 \cup \{s\}$ and $R_2 \supseteq R_1 \supseteq R_3$.

According to yet another aspect in the method of securing information flow in a information system, the allowing reading access simultaneously changes the label of 's' to $(s_1, R_1 \cap R_2, W_1 \cup W_2)$.

In accordance with another aspect of the one or more embodiments of the invention there is provided a computer readable medium embodying computer implemented method for securing information flow in an operating system comprising: a runtime monitor for intercepting calls to system library of the operating system by all applications; a system-state information component for containing the labels associated with the subjects and the objects in the operating system; a state transformation rules component for encoding permissible state transformation rules regarding the levels during the object creation, modification and verification of the subject labels during the object access.

According to another aspect, the computer readable medium embodying computer implemented method for securing information flow in an operating system comprises rule engine in the state transformation rules component accepts levels of subjects and objects and determines if access is to be granted or denied.

According to yet another aspect in the computer readable medium embodying computer implemented method for securing information flow in an operating system, the runtime monitor intercepts the request, identifies s, o, operation requested, and any other parameters, fetches $\lambda(s)$ and $\lambda(o)$ from the system-state information, passes s, o, operation requested with any parameters, $\lambda(s)$ and $\lambda(o)$ to the state transformation rules component and receives the result of access request granting or denial and responds to the application appropriately, here $\lambda$ is $S \cup O \rightarrow L$ labelling function that returns the current label of entity, and S is set of the subjects in the operating system, O is set of the objects in the operating system.

According to another aspect, the method for securing information flow in an operating system by involving the computer readable medium embodying the computer implemented method for securing information flow in an operating system, includes: intercepting subject's request call to the system library by involving the runtime monitor and seeking the labels of the subject making the request and the object for which the request is made from the system-state information component; forwarding the request with the labels of the subjects requesting access and the object to the state transformation rules component on receiving the labels desired from the system-state information component; checking state transformation rules based on the labels in the state transformation rules component for determining allowance of the access request; changing in the system-state information component if the decision is to allow request, and if the operation is either create or read or administrative and thereby forwarding result of request in the form of allow or deny to the runtime monitor by involving the system-state information component; forwarding the call together with parameter list to the system library call handler for processing the call and returns the result to the subjects on allowing the requests; and returning an error message to the subjects if the request is denied by involving the runtime monitor.

According to another aspect in the method for securing information flow in an operating system by involving the computer readable medium embodying the computer implemented method for securing information flow in an operating system, the checking State transformation rules based on the labels in the state transformation rules component for determining allowance of the access request includes: allowing access when the subject 's' with label $(s_1, R_1, W_1)$ requests read access to the object 'o' with label $(s_2, R_2, W_2)$ and if $s_1 \in R_2$; allowing access when the subject 's' with label $(s_1, R_1, W_1)$ requests write access to the object 'o' with label $(s_2, R_2, W_2)$ and if $s_1 \in W_2$ and $R_1 \supseteq R_2$ and $W_1 \subseteq W_2$; allowing access when the subject 's' with label $(s, R, W)$ requests creation of the object and creating the object 'o' with label $(s, R, W \cup \{s\})$; allowing access when the subject 's' with label $(s_1, R_1, W_1)$ requests the object 'o' with label $(s_2, R_2, W_2)$ to be downgraded to label $(s_3, R_3, W_3)$ if $s_1 \in R_2$ and $s_1 = s_2 = s_3$ and $W_1 = W_2 = W_3$ and $R_1 = R_2$ and $R_3 \supseteq R_2$ and $R_3 - R_2 \subseteq W_2$; allowing access when the subject 's' with label $(s_1, R_1, W_1)$ requests the object 'o' with label $(s_2, R_2, W_2)$ to be relabelled with $(s_3, R_3, W_3)$ if $s_1 \in R_2$ and $s_1 = s_2 = s_3$ and $W_2 \subseteq W_1$ and $W_3 = W_1 \cup \{s\}$ and $R_2 \supseteq R_1 \supseteq R_3$.

DETAILED DESCRIPTION

Figure 1:
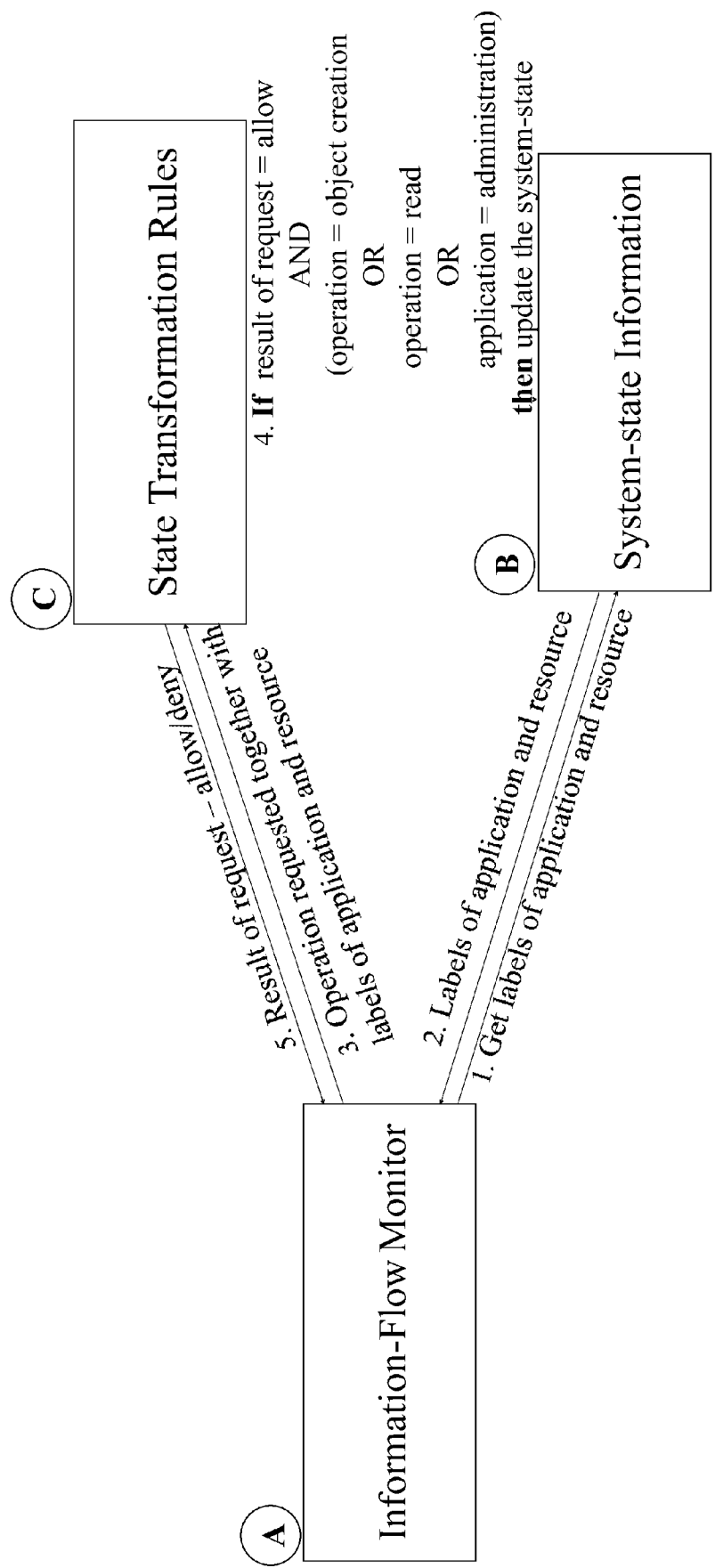
FIG. 1 shows a preferred architecture of a security monitoring in an information system involving RWFM in accordance with an embodiment of the invention.

A summary of the drawbacks of two prominent label models is presented in the table below, also indicating what would be desirable in the ideal scenario.

|  | DLM | DC | Ideal |
|---|---|---|---|
| Confidentiality | only Readers | only Readers | Readers and Writers |
| Integrity | only Writers | only Writers | Readers and Writers |
| Downgrading (DAC) | Purely discretionary | Purely discretionary | Consistent with IFC (MAC) |
| Ownership | Explicit | Implicit | Explicit |
| Authority | Orthogonal to the label | Orthogonal to the label | Explicit in the label |
| Principal hierarchy and Delegation | Orthogonal to the label | Orthogonal to the label | Embedded in the label |
| Bi-directional flow | Difficult | Difficult | Simple and Accurate |
| Ease of use | Moderate | Moderate | Easy |
| Label size | Moderate to Large | Large | Small |
| No. of labels | Large | Large | Small (as required by the application) |

Thus, there has been a need for developing a label system and an information flow model for decentralized information flow control which will consider both the readers and writers of information for a proper tracking of any flow property and effectively secure information flow in multilevel security and privacy domains.

It is thus the basic object of the invention is to develop a method for securing information flow in an information system which would be adapted to consider both the readers and writers of information for a proper tracking of any information flow property and effectively secure the information flow.

Another object of the invention is to develop a method for securing information flow in an information system which would be adapted to enable intuitive specification of security policies in the information flow and supports the discretionary controls required for practical applications in a manner so as to preserve the mandatory nature of the information flow control.

Yet another object of the invention is to develop a method for securing information flow in an information system which would be adapted to provide succinct information flow control across the stakeholders of the system consisting of various subjects and objects that are distributed system wide, through the basic actions of read and write of the information.

A still further object of the invention is to develop a method for securing information flow which would be application independent and adapted to implement in any operating system to secure the information flow to the different stakeholders of the system.

The one or more embodiments disclose a novel information flow securing method based on Readers-Writers Flow Model (herein referred as RWFM) for decentralized information flow control taking into account both the readers and writers of information, which is essential for a proper tracking of any information flow property and securing the information flow in an information system or Information Technology infrastructure. The method proposes a labeling technique which enables intuitive specification of policies, and supports the discretionary controls required for practical applications in a manner so as to preserve the mandatory nature of the information flow control. The method is adapted to be implemented as a computer program product embodied on a computer-readable medium.

The basic architecture of the information flow securing in an information system using the RWFM based information flow securing method is illustrated in the accompanying FIG. 1.

As shown in the FIG. 1, the information flow securing in accordance with the RWFM based securing method basically includes Information-Flow Monitor (A), System-state Information (B) and State Transformation Rules component (C).

The method for securing the information flow in the information system starts with the Information-Flow Monitor (A) which intercepts the access requests to resources or information in the information system by all applications running in the information system for enforcing access control to the information system as per the access rules encoded in the rule engine. The System-state Information component (B) is a certificate database that stores state information having privileges or labels which are intuitively assigned to both the resources and the applications along with unique identifiers for the resources and the applications themselves. The entire state information of the monitor is maintained by the certificate database. This database is modified by a rule engine during resource creation or during administrative action. State Transformation Rule component is the rules engine that encodes the permissible state transformations or the access rules regarding application of privileges or levels during resource creation/modification and verification of application privileges during resource access. The rule engine accepts as inputs privileges or levels of applications and resources and determines if access is to be granted or denied. It defines the dynamic behaviour of the system.

Information-flow monitor intercepts all access requests, and seeks from system-state information about the labels of the application making a request and the resource for which the request is made. Then system-state information component provides the labels desired by the monitor. Information-flow monitor combines the application making the access request and the resource for which the access request is made with their respective labels forwards them to the state transformation rules component.

State transformation rules component checks the allowance of the access request based on comparing of the label corresponding to the application making the access request and the label corresponding to the resource for which the access request is made by involving the rule engine and if the decision is to allow request, and if the operation is either create or read or the application is administrative, this component makes appropriate changes to the system-state information component.

State transformation rules component returns the result of request in the form of allow/deny to the runtime monitor. If the request is allowed, information-flow monitor simply forwards the request to the resource manager; else it returns an error message to the application.

Figure 2:
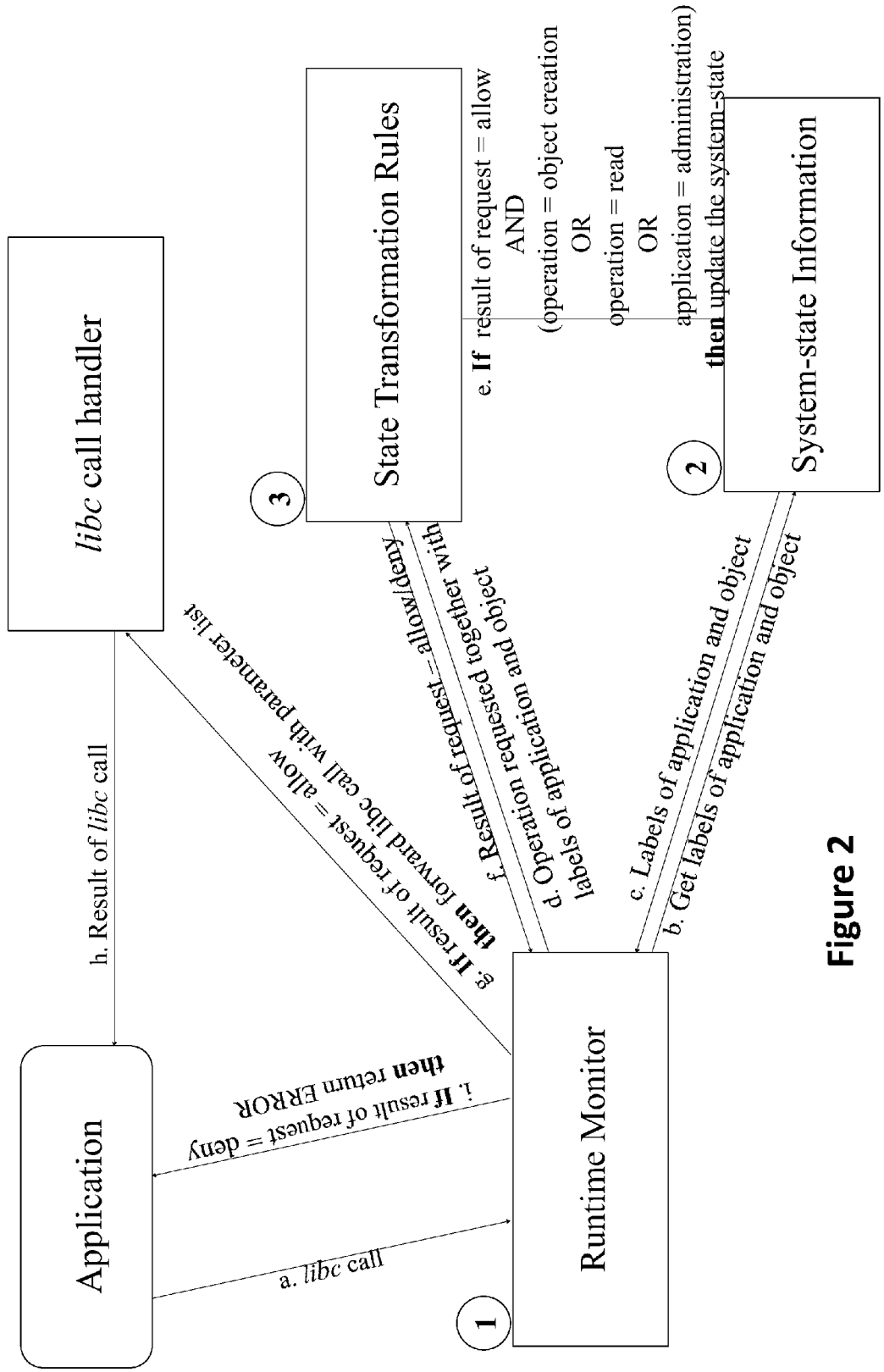
FIG. 2 shows a preferred architecture for securing operating systems using RWFM in accordance with an embodiment of the invention.

Referring now to FIG. 2, which is illustrating a preferred architecture for securing the flow of information in an operating system running in a computing platform by using the RWFM based method. As shown in the referred figure, the Runtime Monitor (1) intercepts the calls to system library (herein referred as libc) of the operating system by all processes for enforcing access control to files on the system as per the rules encoded in the rule engine.

Since all user process' access to file system (running Linux OS variant) goes through the libc, it is sufficient to intercept these library calls to implement cooperative access control. One could move the access control layer within the kernel layer by intercepting system calls to make the system more secure.

The System-state Information component (2) contains the privileges or labels associated with all subjects and objects in the operating system. Herein the subjects refer to the active entities whose actions cause the information to flow and the objects refer to the passive entities containing the information.

The State Transformation Rules component (3) encodes the permissible state transformations rules regarding application of privileges or levels during object creation/modification and verification of subject privileges during object access. The rule engine in the State Transformation Rules component (3) accepts as inputs privileges levels of subjects and objects and determines if access is to be granted or denied. It defines the dynamic behavior of the system.

The entire state information of the system which is maintained in the certificate database of the System-state Information component (2) is also modified by the rule engine during object creation or during administrative action.

During the operation, when application or any subject makes call to a libc routine, the call is intercepted by the runtime monitor. Then, the runtime monitor seeks from system-state information component about the labels of the application or subject making a request and the object for which the request is made. The System-state information component provides the labels desired by the runtime monitor. The Runtime monitor then forwards the operation requested together with the labels of the application or subjects requesting access and the object to state transformation rules component. State transformation rules then are checked based on the labels in the state transformation rules component and if the decision is to allow request, and if the operation is either create or read or the application is administrative, this component makes appropriate changes to the system-state information component. The State transformation rules component returns the result of request in the form of allow/deny to the runtime monitor.

If the request is allowed, runtime monitor simply forwards the libc call together with the parameter list to the libc call handler and the libc call handler processes the call and returns the result to the application or subjects. If the request is denied, then the runtime monitor returns an error message to the application.

The labels explicitly identify possible readers and writers of the information and can be automatically inferred from the natural language specifications. The RWFM based information flow securing method is application independent and can be applied to study any information flow property (confidentiality, integrity, privacy etc.). The method of the invention provides a clean semantics of information flow; combines well with DAC and also supports information downgrading (declassifying) and relabelling. It further provides a clean executional model to realize the multi-level security systems for which checking compliance with respect to security and privacy will become natural.

For securing an information system using RWFM, the first step is to specify the desired security policy. This is achieved by assigning labels to all the subjects and all the objects in the information system depending on the application requirements.

The set of labels in RWFM is given by $S \times 2^S \times 2^S$, where S denotes the set of subjects in the information system and $2^S$ denotes the set of subsets of S, and '×' denotes Cartesian product. In the label assigned to a subject, the first component of the label denotes authority. The second component denotes the set of subjects that can be influenced i.e. the set of readers of the information contained in an object which is accessed by the said subject. The third component denotes the set of subjects that have influenced i.e. the set of writers of the information contained in an object which is accessed by the said subject. In the label assigned to an object, the first component of the label denotes ownership. The second component denotes the set of subjects that can be influenced i.e. the set of readers of the information contained in the object. The third component denotes the set of subjects that have influenced i.e. the set of writers of the information contained in the object.

An exemplary labeling of the subjects and objects are as follows:

S: set of subjects in the system
O: set of objects in the system
$\lambda$: $S \cup O \rightarrow L$: labelling function that returns the current label of an entity
A: $L \rightarrow S$: function that returns the first (administration) component of a label
R: $L \rightarrow 2^S$: function that returns the second (readers) component of a label
W: $L \rightarrow 2^S$: function that returns the third (writers) component of a label Labels for objects are mostly static and are assigned at creation/initiation. However, in the case of subjects, labels are mostly dynamic. The security policy specifies the lowest (default label) and highest (clearance) labels for each subject. Each execution of a subject starts with its default label, and its label is permitted to float up (as it consumes more information) so long as it remains below its clearance. In the case of method, the default label of a subject 's' is set to (s, S, Ø) while its clearance is set to (s, {s}, S). However, depending on the application requirements these may be set more tightly. In fact, the lowest and the highest permissible labels of a subject can be automatically derived from the object labels. Without loss of generality, the lowest label (default) and the highest label (clearance) for a subject s can be fixed to be (s, S, { }) and (s, {s}, S) respectively, where S is the set of all the subjects in the system.

The RWFM supports the following five operations: Read, Write, Create, Downgrade and Relabel by using specific access rules.

During reading of the information in the information system which is secured by the RWFM, when a subject 's' with label $(s_1, R_1, W_1)$ requests read access to an object 'o' with label $(s_2, R_2, W_2)$, if $s_1 \in R_2$, then the label of 's' is changed to $(s_1, R_1 \cap R_2, W_1 \cup W_2)$ and the access is allowed, otherwise access is denied. This results in a state change.

During writing of the information in the information system which is secured by the RWFM, when a subject 's' with label $(s_1, R_1, W_1)$ requests write access to an object 'o' with label $(s_2, R_2, W_2)$, if $s_1 \in W_2$ and $R_1 \supseteq R_2$ and $W_1 \subseteq W_2$, then access is allowed, otherwise access is denied. This never results in a state change.

During creating of the information in the information system which is secured by the RWFM, when a subject 's' with label (s, R, W) requests creation of an object 'o', an object is created and labelled it as (s, R, $W \cup \{s\}$). This is a new object, 'o', together with its label are added to the system, thus, changing the state of the system.

During downgrading in the information system which is secured by the RWFM, when a subject 's' with label $(s_1, R_1, W_1)$ requests an object 'o' with label $(s_2, R_2, W_2)$ to be downgraded to label $(s_3, R_3, W_3)$, if $s_1 \in R_2$ and $s_1 = s_2 = s_3$ and $W_1 = W_2 = W_3$ and $R_1 = R_2$ and $R_3 \supseteq R_2$ and $R_3 - R_2 \subseteq W_2$, then access is allowed, otherwise access is denied. The label of 'o' may change in this case.

During relabeling in the information system which is secured by the RWFM, when a subject 's' with label $(s_1, R_1, W_1)$ requests an object 'o' with label $(s_2, R_2, W_2)$ to be relabelled with $(s_3, R_3, W_3)$, if $s_1 \in R_2$ and $s_1 = s_2 = s_3$ and $W_2 \subseteq W_1$ and $W_3 = W_1 \cup \{s\}$ and $R_2 \supseteq R_1 \supseteq R_3$, then access is allowed, otherwise access is denied.

The algorithm for the access rules are as follows
Access Rule for Read:
Subject $s \in S$ requests read access to object $o \in O$
if $(s \in R(\lambda(o)))$ then
    $a = A(\lambda(s))$
    $r = R(\lambda(s)) \cap R(\lambda(o))$
    $w = W(\lambda(s)) \cup W(\lambda(o))$
    $\lambda(s) = (a, r, w)$
    ALLOW else
    DENY
Access Rule for Write:
Subject s∈S requests write access to object o∈O
if (s∈W(λ(o))^R(λ(s)) ⊇R(λ(o))^W(s)) ⊆W(λ(o))) then
    ALLOW
else
    DENY
Access Rule for Create:
Subject s∈S requests creation of an object
new object o
a=O∪{o}
a=s
r=R(λ(s))
w=W(λ(s))∪{s}
λ(o)=(a,r,w)
Access Rule for Downgrade:
Subject s∈S requests to downgrade object o∈O to (a,r,w)
if (a=A(λ(s))=A(λ(o))^w=W(λ(s))=W(λ(o))^R(λ(s))=R(λ(o))^s∈R(λ(o))^(W(λ(o))={s}v(r⊇R(λ(o))^r−R(λ(o))⊆W(λ(o))))) then
    λ(o)=(a,r,w)
    ALLOW
else
    DENY
Access Rule for Relabel:
Subject s∈S requests to relabel object o∈O with (a,r,w)
if (a=A(λ(s))=A(λ(o))^W(λ(s))⊇W(λ(o))^R(λ(s))⊆R(λ(o))^s∈R(λ(o))^w=W(λ(s))∪{s}^r⊆R(λ(s)))
then
    λ(o)=(a,r,w)
    ALLOW
else
    DENY With reference to the algorithm of the access rule described herein before, the RWFM operates as follows to secure the operating systems System-state information component stores S, O, λ

Runtime monitor intercepts the request, identifies s, o, operation requested, and any other parameters, fetches λ(s) and λ(o) from the system-state information, passes s, o, operation requested with any parameters, λ(s) and λ(o) to the state transformation rules component and receives the result of request and responds to the application appropriately.

State transformation rules component performs the access checks given in the algorithm, updates the system-state information component, if any and returns the result of request (ALLOW/DENY) to the run-time monitor.

Therefore from the perspective of performance of an implementation, RWFM provides simple label management and efficient checking of information flow. RWFM supports a simple floating label system for subjects, that is useful for supporting the principle of least privilege and enables incompatible operations to be performed by a user in isolated sessions. RWFM provides a complete label system in the sense that, any information flow property that can be reasoned with Denning's model can be simulated in RWFM. Further, for a given information flow policy, RWFM provides the smallest set of labels with which the policy can be defined. RWFM makes it easy to reason about information flows not only between a subject and an object but also between any two entities (subject/object). Thus, the relations between the entities in an information system are made explicit by RWFM, which makes it amenable for easy policy verification/validation and compliance checking.

RWFM has been successfully applied for modelling real-world end-to-end security requirements like isolation of processes in operating systems, and interactions amongst the stakeholders in network and web protocols etc and it has been found that RWFM approach to protocol specification unambiguously identifies the origin, intended destination and the purpose of a message.

The RWFM based information flow securing method has been applied in a medical information system. In medical information system, a patient information file is need to be accessed by different stakeholders of the medical information system such as hospital authority, doctors or nurses etc. However, for privacy reasons, any patient may have the following requirements or restriction on the information:
    accessible to no one other than himself, the hospital, doctor and the nurse
    not influenced by anyone other than himself and the doctor This means that, the patient wishes that this information not be disclosed to entities like marketing agencies, drug manufacturers, pharmacies etc who are also stakeholders in a medical information system. On application of RWFM, the above privacy policy specified by the patient is expressed by labeling the patient information as (P, {P, H, D, N}, {P,D}), where P: patient, H: hospital, D: doctor and N: nurse. This label indicates first component is P so it is owned by the patient. The second component of the label is {P, H, D, N} so the information is only readable by the patient, hospital, doctor and nurse. The third component of the label is {P,D} so the patient and the doctor has writing access. Therefore, the access rule of the RWFM will prevent this labeled information flow towards a subject other than P, H, D and N.

This example clearly demonstrates that RWFM policies are intuitive and simple. The RWFM based information flow securing method also prevents practically exploitable vulnerabilities in the EMV protocol (Chip-and-Pin). In particular, vulnerabilities of the EMV protocol reported in literature exploit the fact that there is no way to accurately identify all the stakeholders that influenced a message in the transaction. With the involvement of the RWFM approach, the label of each message in every transaction clearly identifies: (i) the sender of the message, (ii) the stakeholders for whom the message is intended i.e., the permissible readers of the message, and (iii) all the stakeholders that have influenced the message. This enables the stakeholder receiving a message to decide an appropriate response based on its label and the trust relationships.

For example, one of the reported vulnerabilities works as follows: the attacker obtains an authorization certificate from a legitimate transaction on a compromised device, and uses it to perform an illegal transaction on a genuine device. If RWFM model was used, this vulnerability would not have existed, because the message sent in the illegal transaction would have had both the genuine device and the compromised device as the stakeholders that influenced it. Upon receiving the message, the bank can immediately identify the problem and respond with a failure/error message.

Thus, the one or more embodiments of the invention provide a unified information securing method, including the problems addressed by the present state of art. Having thus described the invention of the present application in detail and by reference to the one or more embodiments thereof, it will be apparent that modifications and variations are possible without departing from the scope of the invention defined in the appended claims.

We claim:

1. A method of securing information flow in an information system comprising:

intercepting access requests to information in the information system by all applications running in the information system;

intuitively assigning labels to all the information and the applications depending on the application requirements constituting state information including assigning the labels to all subjects corresponds to active entities whose actions cause information to flow and all objects corresponds to passive entities containing the information in the said information system, wherein the label assigned to the subject and the object are defined as (A, R, W) where A is a function denoting first component or administration of the label, R is a function denoting second component or readers of the label and W is a function denoting third component or writers of the label;

combining the application making the access request and the information for which the access request is made with their respective labels;

checking allowance of the access request based on comparison of the label corresponding to the application making the access request and the label corresponding to the information for which the access request is made by comparing the label corresponding to the subject making the access request with the label corresponding to the object for which the access request is made;

accordingly providing access of the information to the application on detection of allowable access request following:

allowing access when the subject 's' with label $(s_1, R_1, W_1)$ requests read access to the object 'o' with label $(s_2, R_2, W_2)$ and if $s_1 \in R_2$ and simultaneously change the label of 's' to $(s_1, R_1 \cap R_2, W_1 \cup W_2)$;

allowing access when the subject 's' with label $(s_1, R_1, W_1)$ requests write access to the object 'o' with label $(s_2, R_2, W_2)$ and if $s_1 \in W_2$ and $R_1 \supset R_2$ and $W_1 \subset W_2$;

allowing access when the subject 's' with label (s, R, W) requests creation of the object and creating the object 'o' with label $(s, R, W \cup \{s\})$;

allowing access when the subject 's' with label $(s_1, R_1, W_1)$ requests the object 'o' with label $(s_2, R_2, W_2)$ to be downgraded to label $(s_3, R_3, W_3)$ if $s_1 \in R_2$ and $s_1 = s_2 = s_3$ and $W_1 = W_2 = W_3$ and $R_1 = R_2$ and $R_3 \supset R_2$ and $R_3 - R_2 \subset W_2$;

allowing access when the subject 's' with label $(s_1, R_1, W_1)$ requests the object 'o' with label $(s_2, R_2, W_2)$ to be relabeled with $(s_3, R_3, W_3)$ if $s_1 \in R_2$ and $s_1 = s_2 = s_3$ and $W_2 \subset W_1$ and $W_3 = W_1 \cup \{s\}$ and $R_2 \supset R_1 \supset R_3$;

else denying the access request.

2. The method of claim 1, wherein the state information appropriately changed on allowable access request and if operation corresponding to the access request is either creating or reading of the information or administrative.

3. The method of securing information flow in an information system of claim 1, wherein the label assigned to the subject comprises:

said first component for denoting authority;

said second component for denoting set of subjects that can be influenced indicating set of readers of the information contained in the object which is accessed by the said subject;

said third component for denoting set of subjects that have influenced indicating set of writers of the information contained in the object which is accessed by the said subject.

4. The method of claim 3, wherein the label assigned to the subjects are mostly dynamic and includes lowest or default label and highest or clearance label.

5. The method of claim 4, the lowest label of the subject s is set to (s, S, { }) while its highest label is set to (s, {s}, S), wherein the lowest and the highest labels of the subject can be automatically derived from the object labels, S is the set of all the subjects in the information system.

6. The method of securing information flow in an information system of claim 1, wherein the label assigned to the object comprises:

said first component for denoting ownership;

said second component for denoting set of subjects that can be influenced indicating set of readers of the information contained in said object;

said third component for denoting set of subjects that have influenced indicating set of writers of the information contained in said object.

7. The method of claim 6, wherein the label assigned to the objects are mostly static and are assigned at creation/initiation.

* * * * *